United States Patent [19]

Chamuel

[11] 4,420,860
[45] Dec. 20, 1983

[54] QUICK DISCONNECT PIN ASSEMBLY

[75] Inventor: Steve R. Chamuel, West Peabody, Mass.

[73] Assignee: The United States of America as represented by the Secretary of the Army, Alexandria, Va.

[21] Appl. No.: 379,225

[22] Filed: May 17, 1982

[51] Int. Cl.³ .............................................. A44B 17/00
[52] U.S. Cl. ........................................ 24/613; 24/615
[58] Field of Search ................ 24/201 R, 201 C, 208, 24/211 R, 211 N, 211 L, 213 R, 214, 221 R, 115 L

[56] References Cited

U.S. PATENT DOCUMENTS

| | | | |
|---|---|---|---|
| 2,502,097 | 3/1950 | Linder | 24/208 R |
| 2,865,076 | 12/1958 | Newton et al. | 24/211 L |
| 3,052,940 | 9/1962 | Sellers | 24/211 N |
| 3,183,586 | 5/1965 | Sellers | 24/211 N |

*Primary Examiner*—Gene Mancene
*Assistant Examiner*—James Hakomaki
*Attorney, Agent, or Firm*—Robert P. Gibson; Anthony T. Lane; Norman L. Wilson, Jr.

[57] ABSTRACT

A quick disconnect pin assembly is provided with a bushing having an internal bore with an axially extending recess. The disconnect pin, insertable into the bore, has an annular groove in alignment with the recess when the pin is in an inserted position within the bushing. This recess defines a locking ring seat. A resilient locking ring in the groove locks between the seat and the shoulder to prevent withdrawal of the pin after the pin is inserted. The bushing has a side face on its inserted end which is of less diameter than its side face on the other end toward the withdrawal opening of the bushing, forming a space between the bushing and the pin. Part of a release means for releasing the ring from engagement between the seat and the shoulder to deflect it backwardly into the groove so that the pin can be withdrawn utilizes this space.

6 Claims, 6 Drawing Figures

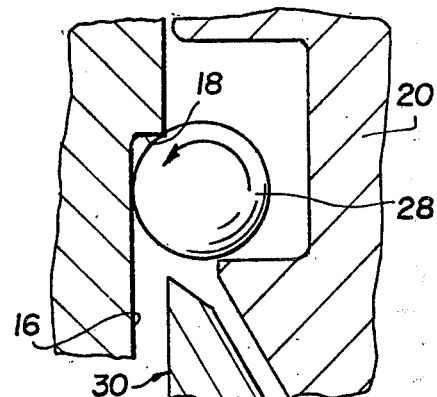
FIG. 3
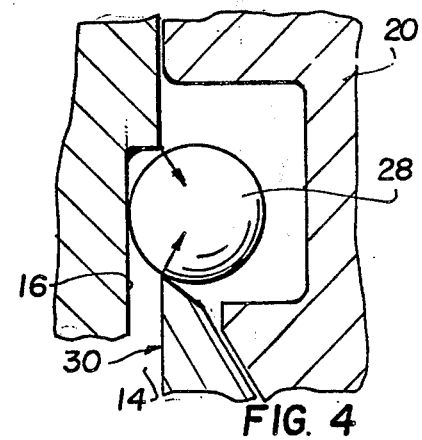
FIG. 4
FIG. 5
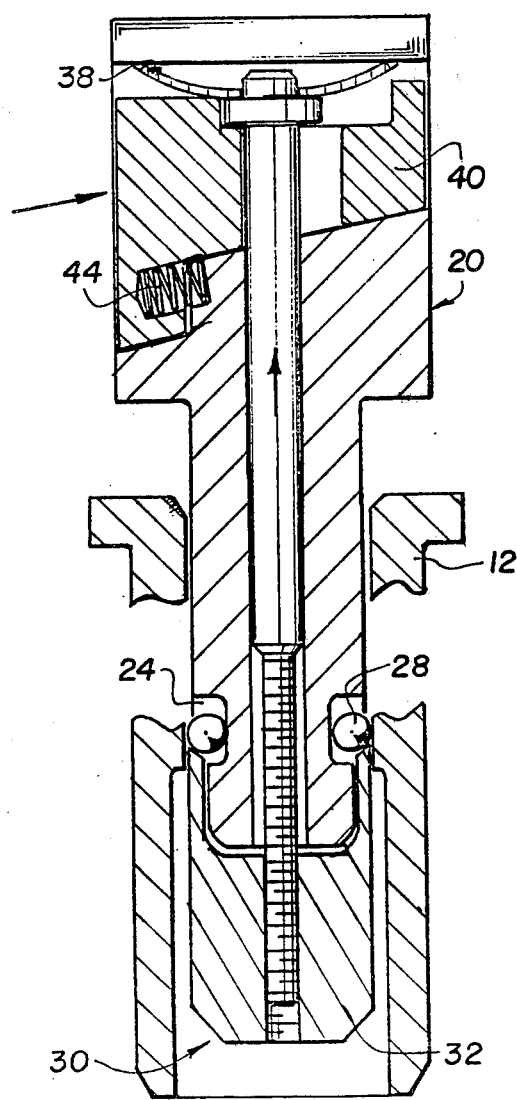
FIG. 6
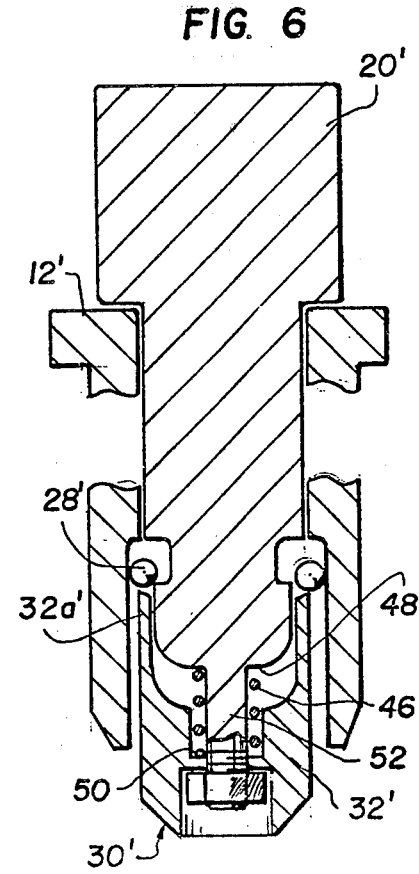

QUICK DISCONNECT PIN ASSEMBLY

FIELD AND BACKGROUND OF THE INVENTION

This invention relates in general to disconnect pins and in particular to a new and useful disconnect pin assembly construction in which a pin is lockable in a bushing by means of a locking ring and which includes release means for releasing the ring so that it is moved out of a locking position to easily permit withdrawal of the pin.

At the present time disconnect pins are known which include locking rings which are arranged so as to permit insertion of the pin into a receiving bushing and effectively prevent the pin's withdrawal. A disadvantage in the known construction is that there is no readily available means for facilitating the connection and disconnection.

SUMMARY OF THE INVENTION

The present invention provides a quick disconnect pin assembly in which a pin is insertable into a receiving bushing and has a locking ring which is adapted to engage between an end shoulder of a recess of the bushing and a seat defined adjacent one end of a locking ring groove of the pin. The locking ring is constructed so that it will engage against the shoulder of the bushing and prevent withdrawal of the pin. The invention also provides means for easily disengaging the locking ring from a locking position so as to facilitate withdrawal of the pin. In one embodiment this is achieved by providing a centering rod within a central bore of the pin which is threadably engaged with a sliding sleeve which has end portions which are movable upon axial shifting of the centering pin to engage and release the locking pin. The centering pin is moved easily by means of a button release which is slidably mounted in the side of the disconnect pin and which when moved against the force of a spring shifts the axial position of a center pin to move a release slide to dislodge the locking ring.

In another embodiment of the invention the locking ring is removed merely by depressing a slide against the force of a holding spring which is mounted on the inner end of the pin assembly and is shiftable along the pin so as to dislodge the locking ring.

Accordingly it is an object of the invention to provide an improved quick disconnect pin having simple means for releasing the pin for disengagement when desired.

A further object of the invention is to provide an improved quick disconnect pin assembly construction which is simple in design, rugged in construction and ecomomical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which preferred embodiments of the invention are illustrated.

BRIEF DESCRIPTION OF THE DRAWINGS

In the Drawings:

FIG. 3 is an enlarged partial sectional view showing the interlocking of the pin and bushing;

FIG. 4 is a view similar to FIG. 3 showing the releasing mechanism in the course of movement to release the retaining ring;

FIG. 5 is a view similar to FIG. 1 showing the pin in a released position; and

FIG. 6 is a view similar to FIG. 1 of another embodiment of the invention.

DETAILED DESCRIPTION OF PREFERRED EMBODIMENTS

Figure 1:
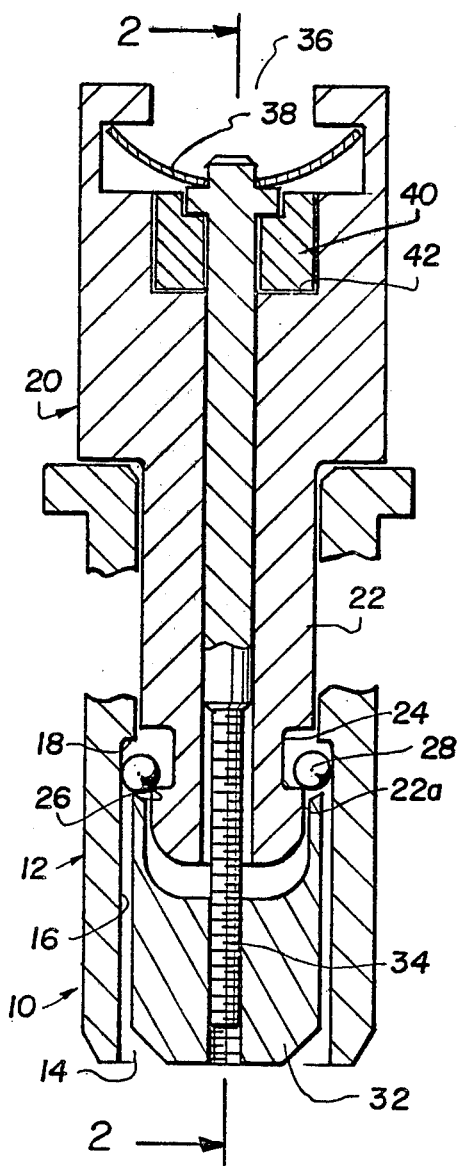
FIG. 1 is an axial sectional view of a quick disconnect pin assembly constructed in accordance with the invention.
Figure 2:
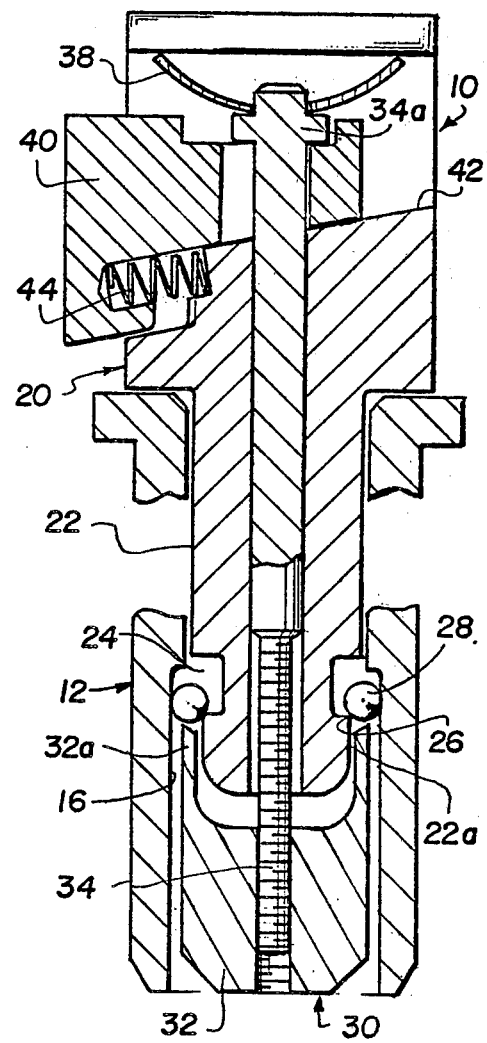
FIG. 2 is a view taken along the line 2—2 of FIG. 1.

Referring to the drawings in particular the invention embodied therein in the embodiment of FIGS. 1 to 5 comprises a quick disconnect pin assembly construction generally designated 10 which includes a receiving bushing generally designated 12 adapted to be positioned on a first fixed part for example as a fastener for securing a plurality of plates together, a bumper for absorbing a load applied to a pin carried on a fixed member, a securing device on a wall or similar object for holding a weight or other object, for theft-proof fasteners or for decorations.

The receiving bushing 12 has an interior bore 14 with a bore face having an axially extending recess 16. The recess 16 terminates on the withdrawal end thereof in a shoulder or abutment 18.

A disconnect pin or pin assembly generally designated 20 is insertable into the bore 14 and it has a side face 22 with an annular groove 24 defined thereon which is disposed so that it will be in alignment with the recess 16 when the pin 20 is in an inserted position within the bushing 22. The side face 22 includes a portion 22a between groove 24 and an end face thereof which is of less diameter than the remaining side face so as to define a locking ring seat 26 at one end of the groove.

A resilient locking ring 28 is engageable on the seat 26 between the pin 10 and the bushing 12 and it is of a size and resilience such that it is pushed into the groove 24 upon insertion of the pin into the bushing, but it locks between the seat 26 and the shoulder 18 to prevent withdrawal of the pin after it is inserted. The locking position is shown for example in FIG. 3. The construction is such as to prevent withdrawal of the pin after it is inserted into the bushing 12.

In accordance with the invention release means 30 are provided which are associated with the pin 20 and the receiving bushing 12 and in the embodiment of FIGS. 1 to 5 comprise a release member 32 which is connected for example by means of a threaded connection to a control member 34 which is slidable in the disconnect pin 20 and which includes a head portion 34a located in a recess 36 at the top of the pin. A resetting spring in the form of a cup spring member 38 is disposed within the recess 36 and bears against an annular shoulder 38 at its ends and the head portion 34a of the control member 34 to urge it to a reset position. In the position shown in FIG. 2 the control member 34 is in the reset position in which an annular skirt 32a of the release member 32 is disposed below the resilient locking ring 28 leaving it in a position such that it can block withdrawal of the pin 20. A release button 40 is mounted for sliding movement on an inclined plane 42 defined on the interior of the recess 36. The button 40 is biased to a non-actuated position by means of a spring 44 and it may be urged against this spring by depressing it with a person's finger to cause the member 40 to move to the right of the position shown in FIG. 2 and thereby raise the control member 34 upwardly along with the release member 32. This upward movement continues until as shown in FIG. 5 the locking ring 28 is dislodged from a locking position and the entire pin 20 is movable out of engagement with the bushing 12. When the releasing means 30 is reset by the action of the spring 38 the locking ring 28 is capable of moving back into a position at which it blocks removal of the pin.

In an alternate embodiment of the invention as shown in FIG. 6 the bushing 12' is provided for receiving a pin 20' having release means 30' which includes a release member 32' with a skirt 32a' provided for releasing the locking ring 28' similarly to the other embodiment. In this embodiment however a resetting spring 46 is disposed between a shoulder 48 of the pin 20' and a shoulder 50 of the release member 32'. The spring 46 biases the member 32' in a downward direction in which the skirt 32a' is spaced away from the locking ring 28'. The shaft-like projection of the pin 20' designated 52 is slidably engaged in the release member 32'. When the release member 32' is pressed against the force of the spring 46 skirt portion 32a' comes into contact with the locking ring 28' and dislodges it from a locking position which it occupies in the embodiment shown in FIG. 6. This permits release of the pin 20' from the bushing 12'.

While specific embodiments of the invention have been shown and described in detail to illustrate the application of the principles of the invention, it will be understood that the invention may be embodied otherwise without departing such principles.

What is claimed is:

1. A quick disconnect pin assembly of type permitting insertion of a pin into a receiving bushing, comprising a receiving bushing having an internal bore adapted to receive a disconnect pin, a portion of the bore away from its receiving end being enlarged, or recessed, to form a shoulder between its smaller bore section and its larger bore section, a disconnect pin insertable in the bore and having a side face portion and an end face portion with an annular groove there between, the groove being in alignment with the recess when the pin is in an inserted position in the bushing, the groove defining a locking ring seat, the end face portion of the disconnect pin having a diameter less than that of the side face portion to provide a release means space, a resilient locking ring disposed in the groove between said pin and said bushing, being of a size and resilience that it is pushed aside into said groove on insertion of said pin into said bushing but locks between said seat and said shoulder to prevent withdrawal of said pin after said pin is inserted into said bushing, and a release means for releasing said ring from engagement between said seat and said shoulder to permit removal of said pin from said bushing, the release means including a release member, movably mounted on said disconnect pin and having a skirt portion in said release means space engageable with said locking ring to dislodge the locking ring from its locked position.

2. A quick disconnect pin according to claim 1, wherein said pin includes an outer pin body, a central control member slidable in said pin body, said release means including a release member connected to said central control member and having a skirt portion disposed below said locking ring, and actuating means engageable with said control member for displacing it relative to said pin body for shifting said release member to dislodge said locking ring from a locking position.

3. A quick disconnect pin assembly according to claim 2, wherein said actuating means includes a button member, said pin member having a recess with a wall portion defining an inclined plane, said actuating member comprising a butt member slidable along said inclined plane and having a surface engageable with said control member, said movement of said pushbutton relative to said pin body causing said control member to move axially relative to said pin body to shift said release member to dislodge said locking ring.

4. A quick disconnect pin assembly according to claim 1, wherein said release means includes a release member mounted on said pin for movement relative thereto, means to bias said release member in a direction to move said member out of engagement with said locking ring, and said release member being movable against said biasing to cause said release member to engage said locking ring to move it out of a locking position.

5. A quick disconnect pin according to claim 4, wherein said pin includes a central shaft portion, said release member being slidable on said shaft portion, spring means biasing said release member in a direction to urge it outwardly from said pin, said release member having a skirt portion surrounding a portion of said pin and engageable with said locking member to dislodge it from a locking position, the end of said release member being exposed from the exterior of said pin and being depressible to permit said pin to become dislodged from said bushing.

6. A quick disconnect pin according to claim 1, wherein the release means includes means for urging said release member to a reset position in which said skirt portion does not engage said locking ring, and means for moving said release member to a release position to dislodge said locking ring from a locking position.

* * * * *